(12) United States Patent
Knezevic et al.

(10) Patent No.: US 9,929,862 B2
(45) Date of Patent: Mar. 27, 2018

(54) OPTIMIZED HARDWARE ARCHITECTURE AND METHOD FOR ECC POINT DOUBLING USING JACOBIAN COORDINATES OVER SHORT WEIERSTRASS CURVES

(71) Applicant: NXP B.V., Eindhoven (NL)

(72) Inventors: Miroslav Knezevic, Leuven (BE); Ventzislav Nikov, Heverlee (BE)

(73) Assignee: NXP B.V., Eindhoven (NL)

( * ) Notice: Subject to any disclaimer, the term of this patent is extended or adjusted under 35 U.S.C. 154(b) by 197 days.

(21) Appl. No.: 14/139,847

(22) Filed: Dec. 23, 2013

(65) Prior Publication Data

US 2015/0180665 A1    Jun. 25, 2015

(51) Int. Cl.
*H04L 9/00* (2006.01)
*H04L 9/30* (2006.01)
*G09C 1/00* (2006.01)
*G06F 7/72* (2006.01)

(52) U.S. Cl.
CPC .............. *H04L 9/3066* (2013.01); *G09C 1/00* (2013.01); *G06F 7/725* (2013.01); *H04L 2209/122* (2013.01)

(58) Field of Classification Search
CPC ........ H04L 9/3066; H04L 9/003; G06F 7/725
USPC .......................................................... 380/30
See application file for complete search history.

(56) References Cited

U.S. PATENT DOCUMENTS

| 6,112,218 | A | 8/2000 | Gandhi et al. |
| 6,366,940 | B1 | 4/2002 | Ono et al. |
| 6,567,832 | B1 | 5/2003 | Ono |
| 6,738,478 | B1 | 5/2004 | Vanstone et al. |
| 7,508,936 | B2 * | 3/2009 | Eberle ..................... G06F 7/724 380/28 |
| 7,702,105 | B1 * | 4/2010 | Gura et al. ..................... 380/255 |
| 8,112,626 | B1 | 2/2012 | Adler |
| 8,582,758 | B2 | 11/2013 | Joye |
| 2001/0033655 | A1 | 10/2001 | Vadekar et al. |
| 2003/0068037 | A1 * | 4/2003 | Bertoni ................... G06F 7/724 380/30 |
| 2004/0158597 | A1 | 8/2004 | Ye et al. |
| 2007/0198824 | A1 | 8/2007 | Chen et al. |
| 2009/0300087 | A1 | 12/2009 | Tajiri |
| 2009/0319804 | A1 | 12/2009 | Qi et al. |
| 2010/0011047 | A1 | 1/2010 | Jackson et al. |
| 2010/0040225 | A1 * | 2/2010 | Venelli et al. .................. 380/28 |

(Continued)

FOREIGN PATENT DOCUMENTS

CN          101782845 A     7/2010
CN          102109974 A     6/2011
(Continued)

OTHER PUBLICATIONS

EP Communication—European Search Report in EP 14198456.7 dated Apr. 7, 2015.

(Continued)

*Primary Examiner* — Hadi Armouche
*Assistant Examiner* — Bryan Wright (57) ABSTRACT

An optimized hardware architecture and method introducing a simple arithmetic processor that allows efficient implementation of an Elliptical Curve Cryptography point doubling algorithm for Jacobian coordinates. The optimized architecture additionally reduces the required storage for intermediate values.

8 Claims, 6 Drawing Sheets

(56) References Cited

U.S. PATENT DOCUMENTS

| | | | | |
|---|---|---|---|---|
| 2010/0150340 A1* | 6/2010 | Choi | ............... | G06F 7/725 380/28 |
| 2011/0075836 A1* | 3/2011 | Yamamoto | ............... | G06F 7/725 380/28 |
| 2014/0016772 A1* | 1/2014 | Yajima | ............... | H04L 9/003 380/28 |

FOREIGN PATENT DOCUMENTS

| | | | |
|---|---|---|---|
| CN | 102279725 | A | 12/2011 |
| CN | 102297725 | A | 12/2011 |
| CN | 102393812 | A | 3/2012 |
| JP | 2007-286380 | A | 11/2007 |
| JP | 4621162 | B2 | 1/2011 |

OTHER PUBLICATIONS

Baktir, et al., A state-of-the-art Elliptic Curve Cryptographic Processor Operating in the Frequency Domain, Mobile Networks an Applcations (Monet) Journal, vol. 12, No. 4, Sep. 30, 2007, Kluwer Academic Publishers, Boston.

Bernstein, A Software Implementation of NIST P-224, retrieved from the internet: Oct. 29, 2001 URL:http://cr.yp.to/talks/2001.10.29/slides.ps/2001.10/29/slide—retrieved Mar. 25, 2015.

Izu, et al., Fast Elliptic Curve Multiplications with SIMD Operations, IEICE Transactions on Fundamentals of Electronics, Communications and Computer Sciences, Engineering Sciencies Society, vol. E87-A, No. 1, pp. 85-93.

Anonymous, EFD/Genus-1 large-characteristic/Jacobian coordinates with a4=-3 for short Weierstrass curves, Mar. 25, 2015, retrieved from the internet: http://web.archive.org.web/20131203080425/http://hyperelliptic.org/EFD/glp/auto-shortw-jacobian-3.html.

Extended European Search Report for Patent Appin. No. 14198913.7 (Jun. 25, 2015).

Cohen, H. et al. "Efficient Elliptic Curve Exponentiation Using Mixed Coordinates", International Conference on the Theory and Application of Cryptology and Information Security: Advances in Cryptology, pp. 51-65 (Oct. 18, 1998).

Johnson, D. et al. "The Elliptic Curve Digital Signature Algorithm (ECDSA)", Certicom Corporation, 56 pgs, retrieved from the internet at: http://cs.ucsb.edu/~koc/ccs130h/notes/ecdsa-cert.pdf (2001).

Lochter, M. et al. "Elliptic Curve Cryptograhy (ECC) Brainpool Standard Curves and Curve Generation", 28 pgs, retrieved from the internet at: https://tools.ietf.org/html/rfc5639 (Mar. 2010).

Miller, V. S "Use of Elliptic Curves in Cryptography", Conference on the Theory and Application of Cryptographic Techniques, pp. 417-426 (1985).

Koblitz, N. et al. "Elliptic Curve Cryptosystems", Mathematics of Computation, vol. 48, No. 177, pp. 203-209 (Jan. 1987).

"Fips Pub 186-3—Federal Information Processing Standards Publication—Digital Signature Standard (DSS)", National Institute of Standards and Technology, 131 pgs, retrieved from the internet at: http://csrc.nist.gov/publications/fips/fips186-3/fips_186-3.pdf (Jun. 2009).

"SEC 2: Recommended Elliptic Curve Domain Parameters—Version 1.0", Standards for Efficient Cryptography, Certicom Corporation, 51 pgs, retrieved from the internet at: http://www.secg.org/SEC2-Ver-1.0.pdf (Sep. 20, 2000).

Hankerson, D. et al. "Guide to Elliptic Curve Cryptography", Springer, 332 pgs (2004).

Hankerson, D. et al. "Elliptic Curve Arithmetic—Guide to Elliptic Curve Cryptography", Springer, pp. 75-113 (Jan. 1, 2004).

Batina, L. et al. "Hardware architectures for public key cryptography", Integration, the VLSI journal 34, pp. 1-64 (2003).

Guneysu, T. et al. "Ultra High Performance ECC over NIST Primes on Commercial FPGAs", International Workshop on Cryptographic Hardward and Embedded Systems, pp. 62-78 (2008).

Vinay, T. et al. "FPGA Impementation of Elliptical Curve Cryptography Using Mixed Coordinates", International Journal of VLSI and Embedded Systems-Ijves, vol. 4, Article 6104, pp. 438-443 (Jun. 2013).

Bednara, M. et al. "Tradeoff Analysis of FPGA Based Elliptic Curve Cryptography", IEEE International Symposium on Circuits and Systems, pp. 797-800 (Aug. 7, 2002).

Extended European Search Report for Patent Appln. No. 14198280.1 (Jul. 28, 2015).

Office Action from related CN Appln. No. 201410806141.2 (Mar. 1, 2017).

Szerwinski, R. "Efficient Cryptography on Graphics Hardware", 133 pgs, Diploma Thesis, Dept. of Electrical Engineering & Information Sciences, Ruhr-Univ. Bochum, retrieved from the internet at: https://www.emsec.rub.de/media/crypto/attachments/files/2010/04/da_szerwinski.pdf (Feb. 15, 2008).

Communication pursuant to Article 94(3) EPC for counterpart EP patent application 14198913.7 (Apr. 3, 2017).

Office Action from counterpart CN Appln. No. 20140799942.0 (Jul. 3, 2017).

Office Action from counterpart CN Appln. No. 201410799942.0 (Jul. 3, 2017).

Feng, W. "Refinement of algorithm for computing Tate parings of "RFC5091"", Journal of Fujian University of Technology, vol. 9, No. 1, 4 pgs. (Feb. 2011).

Office Action for related Counterpart CN Application No. 201410787996.5 (Nov. 15, 2017).

Notice of Allowance for Related U.S. Appl. No. 14/139,831 (Oct. 10, 2017).

* cited by examiner

FIG. 1
PRIOR ART

INPUT: $P = (X_1 : Y_1 : Z_1)$ IN JACOBIAN COORDINATES, ON E/K:
$y = x^3 - 3x + b$ CURVE.
OUTPUT: $2P = (X_3 : Y_3 : Z_3)$ IN JACOBIAN COORDINATES.
1: if $P = \infty$ then return $\infty$
2: $T_1 = Z_1^2$
3: $T_2 = X_1 - T_1$
4: $T_1 = X_1 + T_1$
5: $T_2 = T_2 * T_1$
6: $T_2 = 3T_2$
7: $Y_3 = 2Y_1$
8: $Z_3 = Y_3 * Z_1$
9: $Y_3 = Y_3^2$
10: $T_3 = Y_3 * X_1$
11: $Y_3 = Y_3^2$
12: $Y_3 = Y_3/2$
13: $X_3 = T_2^2$
14: $T_1 = 2T_3$
15: $X_3 = X_3 - T_1$
16: $T_1 = T_3 - X_3$
17: $T_1 = T_1 * T_2$
18: $Y_3 = T_1 - Y_3$
19: return $(X_3 : Y_3 : Z_3)$

OPTIMIZED HARDWARE ARCHITECTURE AND METHOD FOR ECC POINT DOUBLING USING JACOBIAN COORDINATES OVER SHORT WEIERSTRASS CURVES

BACKGROUND

Electronic devices are becoming a ubiquitous part of everyday life. The number of smartphones and personal tablet computers in use is rapidly growing. A side effect of the increasing use of smartphones and personal tablets is that increasingly the device are used for storing confidential data such as personal and banking data. Protection of this data against theft is of paramount importance.

The field of cryptography offers protection tools for keeping this confidential data safe. Based on hard to solve mathematical problems, cryptography typically requires highly computationally intensive calculations that are the main barrier to wider application in cloud and ubiquitous computing (ubicomp). If cryptographic operations cannot be performed quickly enough, cryptography tools are typically not accepted for use on the Internet. In order to be transparent while still providing security and data integrity, cryptographic tools need to follow trends driven by the need for high speed and the low power consumption needed in mobile applications.

Public key algorithms are typically the most computationally intensive calculations in cryptography. For example, take the case of Elliptic Curve Cryptography (ECC), one of the most computationally efficient public key algorithms. The 256 bit version of ECC provides security that is equivalent to a 128 bit symmetric key. A 256 bit ECC public key should provide comparable security to a 3072 bit RSA public key. The fundamental operation of ECC is a point multiplication which is an operation heavily based on modular multiplication, i.e. approximately 3500 modular multiplications of 256 bit integers are needed for performing one ECC 256 point multiplication. Higher security levels (larger bit integers) require even more computational effort.

Figure 1:
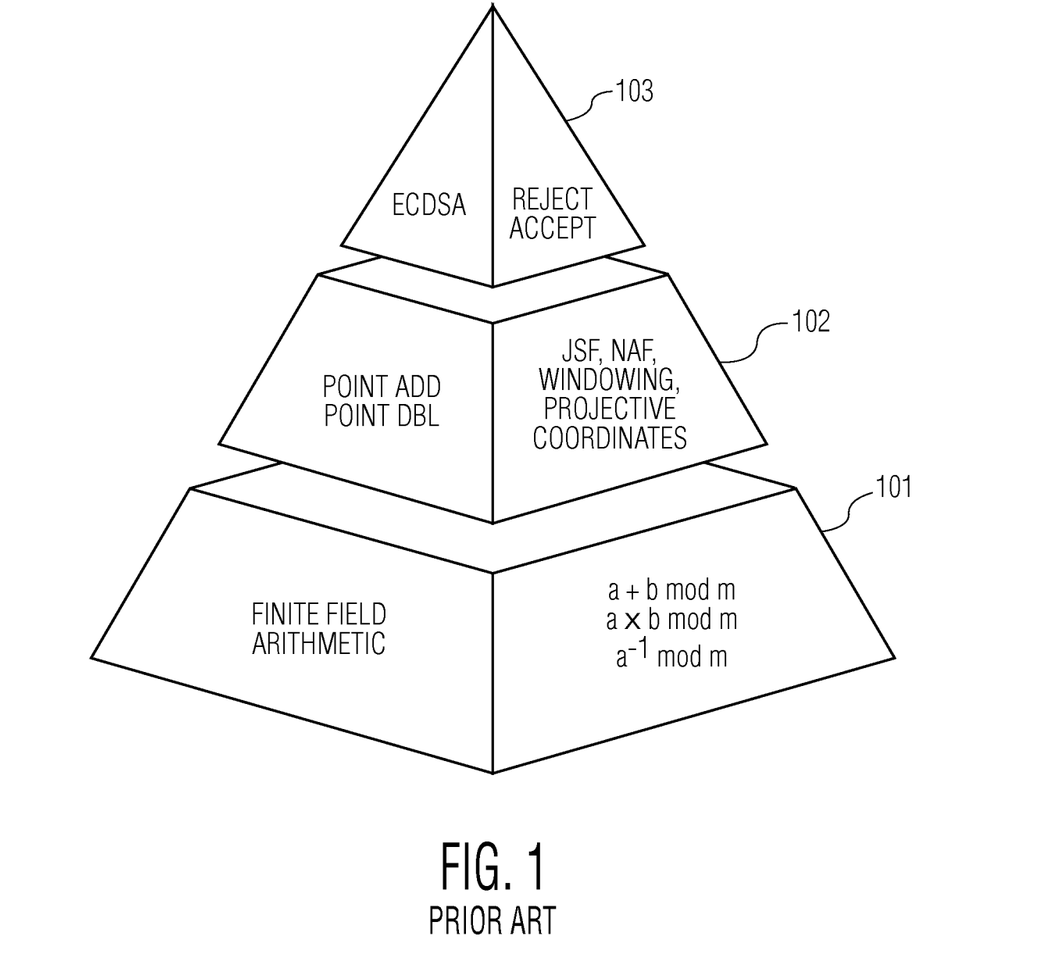
FIG. 1 shows stages 101, 102 and 103 that are needed to realize the Elliptical Curve Digital Signature Algorithm (ECDSA).

Building an efficient implementation of ECC is typically non-trivial and involves multiple stages. FIG. 1 illustrates stages 101, 102 and 103 that are needed to realize the Elliptical Curve Digital Signature Algorithm (ECDSA), which is one of the applications of ECC. Stage 101 deals with finite field arithmetic that comprises modular addition, inversion and multiplication. Stage 102 deals with point addition and point doubling which comprises the Joint Sparse Form (JSF), Non-Adjacent Form (NAF), windowing and projective coordinates. Finally, stage 103 deals with the ECDSA and the acceptance or rejection of the digital signature.

Any elliptic curve can be written as a plane geometric curve defined by the equation of the form (assuming the characteristic of the coefficient field is not equal to 2 or 3):

$$y^2 = x^3 + ax + b \qquad (1)$$

that is non-singular; that is it has no cusps or self-intersections and is known as the short Weierstrass form where a and b are integers. The case where $a = -3$ is typically used in several standards such as those published by NIST, SEC and ANSI which makes this the case of typical interest.

Many algorithms have been proposed in the literature for efficient implementation of the Point Addition (PDBL) and Point Doubling (PDBL) operations. Many of these algorithms are optimized for software implementation. While these are typically efficient on certain platforms, the algorithms are typically not optimal once the underlying hardware can be tailored to the algorithm.

Figure 2:
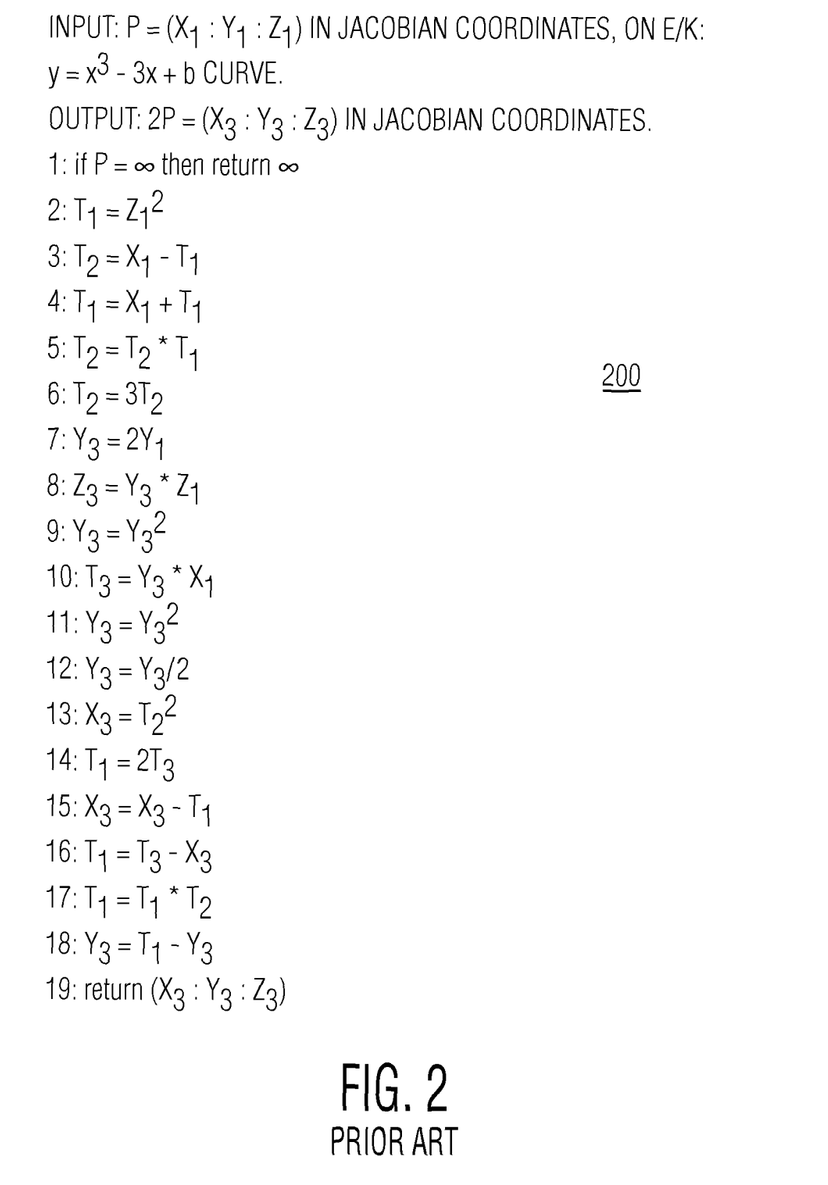
FIG. 2 shows a prior art point doubling algorithm.

A PDBL algorithm for Jacobian coordinates has been described by Cohen, Miyaji and Ono in Proceedings of the International Conference on the Theory and Applications of Cryptography and Information Security; Advances in Cryptology, ASIACRYPT 1998, pages 51-65, Springer-Verlag, 1998. Jacobian coordinates are projective coordinates where each point is represented as three coordinates (X, Y, Z). Note the coordinates are all integers. PDBL algorithm 200 requires 4 modular multiplications, 4 modular squarings, 4 modular subtractions, one modular addition, one modular multiplication by 2 and one modular division by 2 and is shown in FIG. 2. In order to perform the PDBL, the algorithm further requires a minimum of 3 temporary registers, which for ECC 256 bit each need to be 256 bits in size. All operations are done in the finite field K over which the elliptic curve E is defined. The finite arithmetic field K is defined over the prime number p so that all arithmetic operations are performed modulo p. The identity element is the point at infinity.

SUMMARY

An optimized hardware architecture and method reduces storage requirements and speeds up the execution of the ECC PDBL algorithm by requiring only two temporary storage registers and by introducing a simple arithmetic unit for performing modular addition, subtraction and multiplication and division by 2.

DETAILED DESCRIPTION

Figure 3:
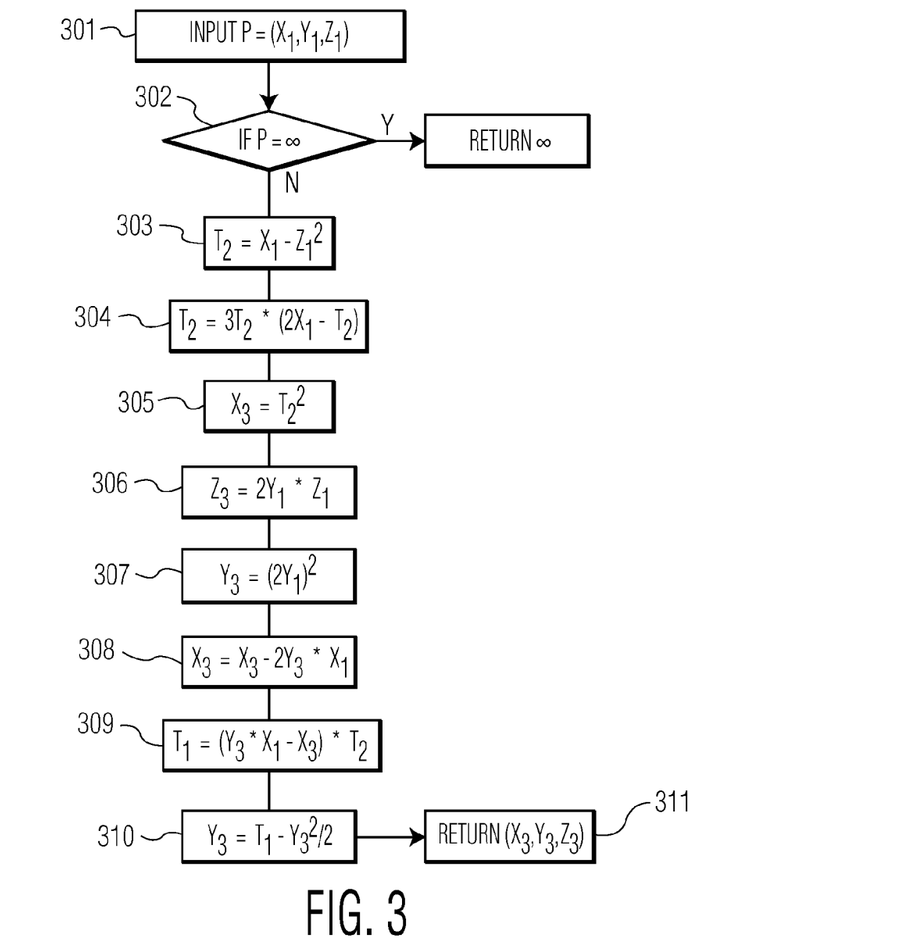
FIG. 3 shows an embodiment in accordance with the invention.

PDBL algorithm 300 in accordance with the invention is shown in FIG. 3. PDBL algorithm 300 requires fewer steps and reduces the storage requirements compared to PDBL algorithm 200 for the same modular point doubling. PDBL algorithm 300 requires only two temporary storage registers, $T_1$ and $T_2$. PDBL algorithm 300 is implemented over an optimized hardware architecture shown in FIG. 6 and FIG. 7 and specifically designed to take advantage of PDBL algorithm 300.

As input in step 301, PDBL algorithm 300 shown in FIG. 3 takes point $P = (X_1, Y_1, Z_1)$ in Jacobian coordinates. $T_1$ and $T_2$ are temporary storage variables. Note that all mathematical operations shown are in modular arithmetic and all coordinates are Jacobian. In step 302 of PDBL algorithm 300, if $P = \infty$ (the identity element) the value $\infty$ is returned. In step 303, the coordinate $Z_1$ is squared ($Z_1 * Z_1$) and subtracted from $X_1$ with the resulting value stored in temporary register $T_2$. In step 304, $3T_2*(2X_1-T_2)$ is calculated and the resulting value stored in temporary register $T_2$. In step 305, $T_2$ is squared and the result stored in $X_3$. In step 306, $2Y_1*Z_1$ is calculated, the result stored in $Z_3$. In step 307, $2Y_1$ is calculated and squared ($2Y_1*2Y_1$) with the result stored in $Y_3$. In step 308, $X_3-2Y_3*X_1$ is calculated and the result stored in $X_3$. In step 309, $(Y_3*X_1-X_3)$ is calculated and multiplied by $T_2$ and the result is stored in $T_1$. Note that the quantity $Y_3*X_1$ was already calculated in step 308 so step 309 only requires a single modular multiplication (by $T_2$). In step 310, $T_1-Y_3*Y_3/2$ is calculated and the result is stored in $Y_3$. Finally, in step 311 the result of the point doubling of P is returned in Jacobian coordinates as $(X_3, Y_3, Z_3)$.

The most computationally intensive operation in PDBL algorithm 300 in FIG. 3 is modular multiplication denoted by "*". Because most of the steps described in PDBL algorithm 300 depend on the previous steps of the algorithm, it is typically most efficient to implement PDBL algorithm 300 in hardware using a single modular multiplier although more than one modular multiplier may be used in accordance with the invention which allows more than one modular multiplication to be performed in a step. Using only one modular multiplier restricts each step in PDBL algorithm 300 to having no more than one modular multiplication.

Figure 4:
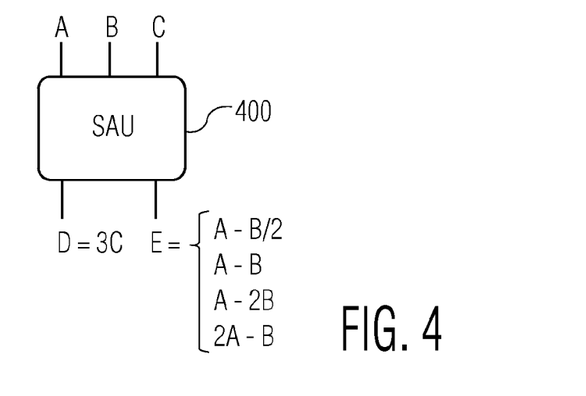
FIG. 4 shows an embodiment in accordance with the invention.

It is important to note that besides the modular multiplication steps performed in steps 303, 308 and 309 of PDBL algorithm 300, additional, comparatively simple operations are performed as well: modular subtraction and addition and modular multiplication and division by 2. Note that multiplication or division by a power of 2 in binary is merely a shift operation. In order to accelerate execution of PDBL algorithm 300 and eliminate the need for additional temporary registers, an embodiment in accordance with the invention of simple arithmetic unit (SAU) 400 with the inputs and outputs as shown in FIG. 4 is used.

Figure 5:
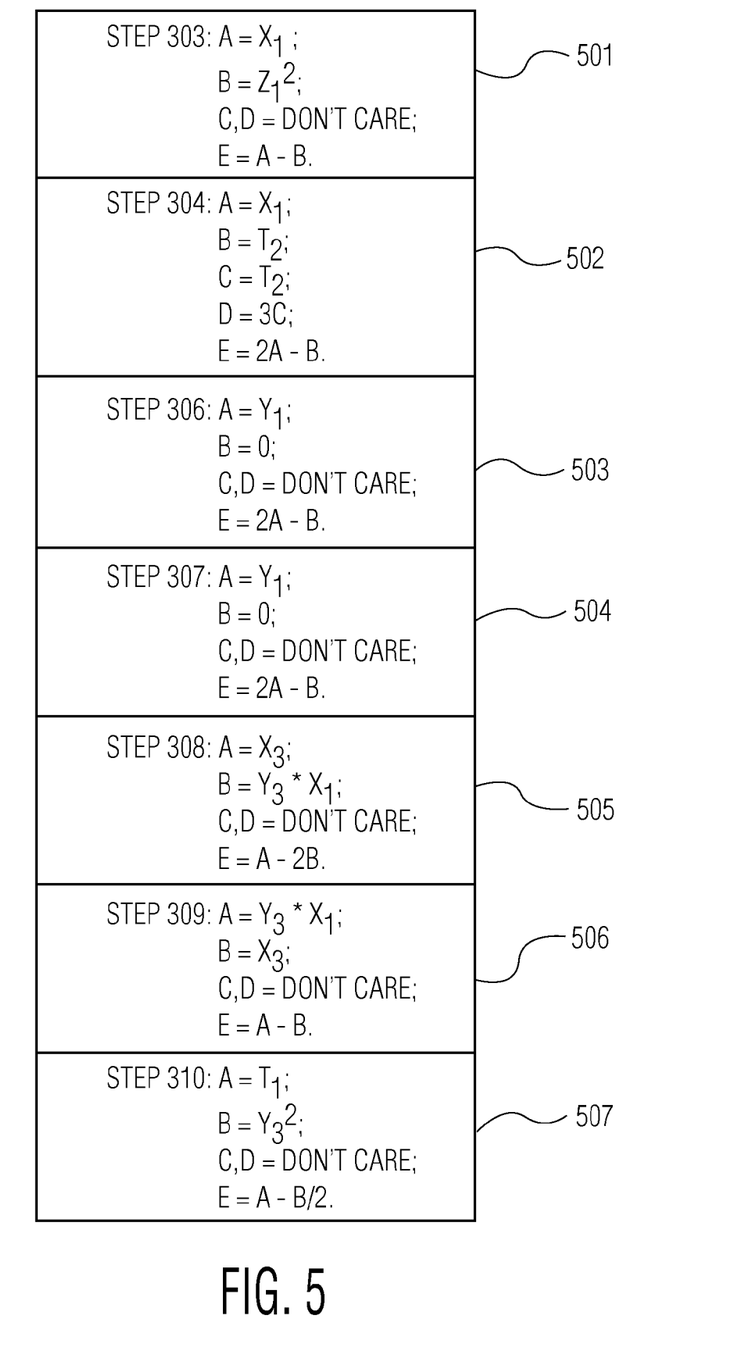
FIG. 5 shows an embodiment in accordance with the invention.

FIG. 5 shows how steps 303, 304, 306, 307, 308, 309 and 310 are broken down to take advantage of SAU 400 which has inputs A, B and C with outputs D and E. Note that the input and output labels of SAU 400 correspond to the respective variable names in FIG. 5. Block 501 shows how step 303 of PDBL algorithm 300 is broken down using SAU 400 and involves setting inputs $A=X_1$ and $B=Z_1^2$ with output $E=A-B$. Block 502 shows how step 304 of PDBL algorithm 300 is broken down using SAU 400 and involves setting inputs $A=X_1$, $B=T_2$ and $C=T_2$ with outputs $D=3C$ and $E=2A-B$. Outputs D and C are then multiplied together and the result is stored in temporary register $T_2$. Block 503 shows how step 306 of PDBL algorithm 300 is broken down using SAU 400 and involves setting $A=Y_1$ and $B=0$ with output $E=2A-B$. Output E is then multiplied by $Z_1$ and the result is stored in $Z_3$. Block 504 shows how step 307 of PDBL algorithm 300 is broken down using SAU 400 and involves setting inputs $A=Y_1$ and $B=0$ with output $E=2A-B$. Output E is then multiplied by itself and the result is stored in $Y_3$. Block 505 shows how step 308 of PDBL algorithm 300 is broken down using SAU 400 and involves setting inputs $A=X_3$ and $B=X_1*Y3$ with output $E=A-2B$. Output E is stored in $X_2$. Block 506 shows how step 309 of PDBL algorithm 300 is broken down using SAU 400 and involves setting input $A=X_1*Y_3$ and $B=X_3$ with output $E=A-2B$. Note that step 309 reuses the result of step 308 for $X_1*Y_3$ (stored in the output register of the multiplier). Output E is stored in $X_3$. Block 507 shows how step 310 of PDBL algorithm 300 is broken down using SAU 400 and involves setting inputs $A=T_1$ and $B=Y_3^2$ with output $E=A-B/2$. Note that "don't care" indicates the value is irrelevant to the calculation being performed in the respective steps.

Figure 6:
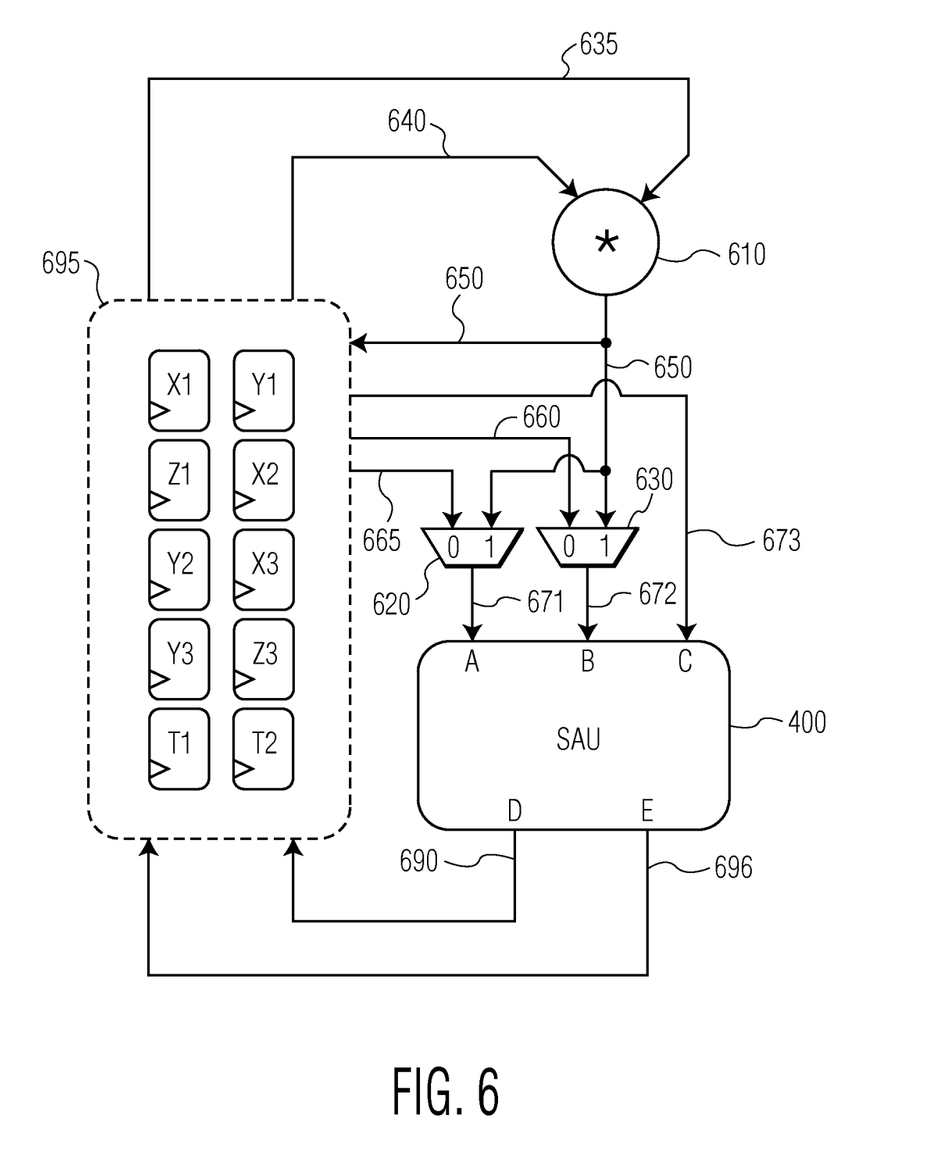
FIG. 6 shows an embodiment in accordance with the invention.

FIG. 6 shows embodiment 600 in accordance with the invention comprising multi-cycle multiplier 610 with output register (not shown), SAU 400, multiplexer (MUX) 620 and MUX 630 with input registers $X_1$, $Y_1$, $Z_1$, ($x_2$, $y_2$—not used), output registers $X_3$, $Y_3$, $Z_3$ and temporary registers $T_1$ and $T_2$ that are all part of register memory 695. Note the individual register labels correspond to variable names in FIGS. 3 and 5. MUX 620, 630 and 740 (part of SAU 400, see FIG. 7) are controlled by the microprocessor (not shown) which schedules the steps of PDBL algorithm 300. As noted above, each step in PDBL algorithm 300 involve at most one modular multiplication by multi-cycle multiplier 610 (not counting multiplication or division by 2 which in binary representation is merely a shift operation).

Figure 7:
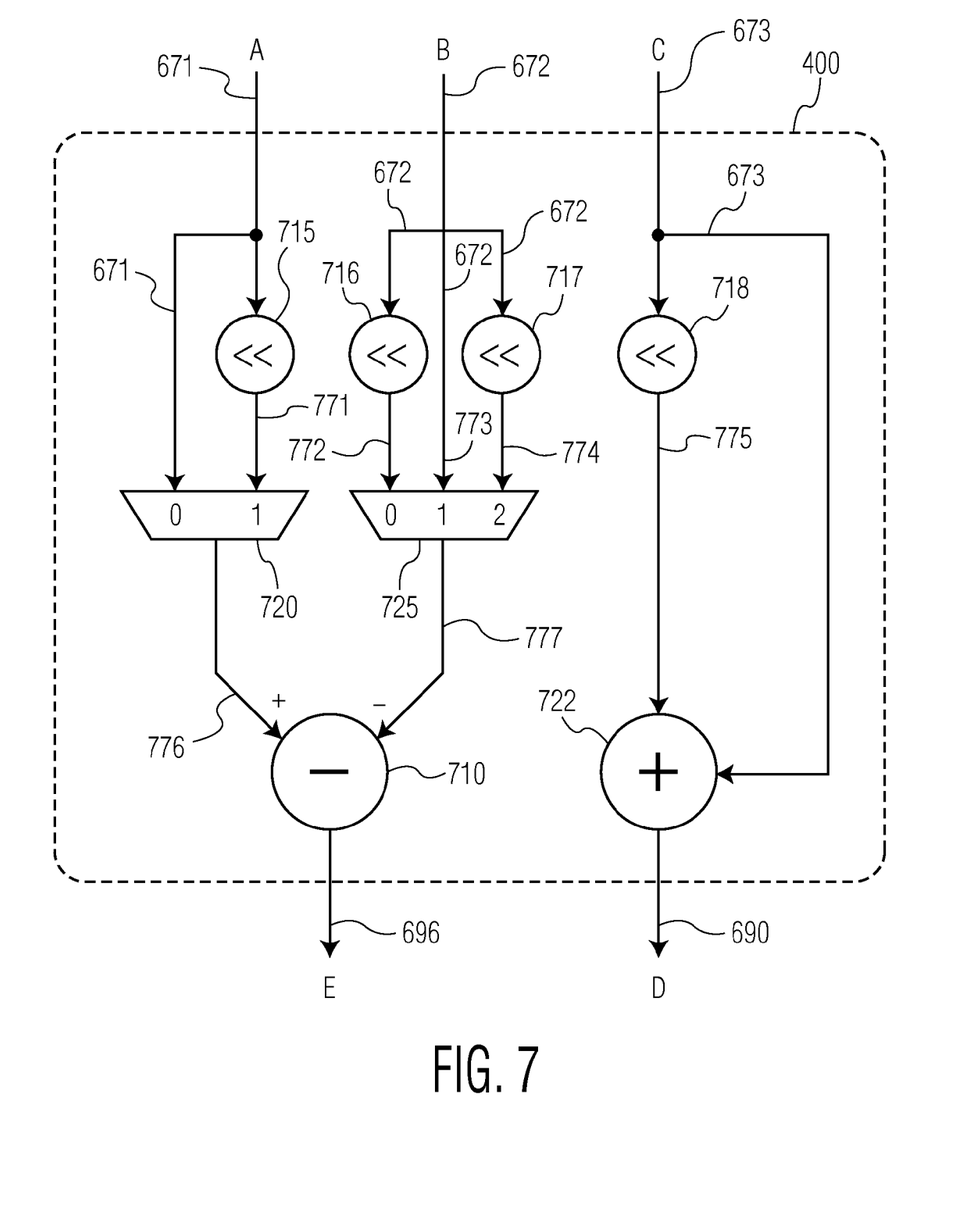
FIG. 7 shows an embodiment in accordance with the invention.

SAU 400 shown in FIG. 7 comprises subtractor 710 and adder 711, logical one bit left shifter 715 (multiplication by 2), logical one bit right shifter 716 (division by 2), logical one bit left shifter 717 (multiplication by 2), logical one bit left shifter 718 (multiplication by 2), MUX 720 and MUX 725.

Input A goes to both input "0" of MUX 720 and logical one bit left shifter 715 on line 671. Logical one bit left shifter 715 multiplies input A by two and outputs 2A on line 771 to the "1" input of MUX 720. Output line 776 of MUX 720 provides the minuend input for subtractor 710. Input B goes to logical one bit right shifter 716, logical one bit left shifter 717 and input "1" of MUX 725 on line 672. Logical one bit right shifter 716 divides input B by two and outputs B/2 on line 772 to input "0" of MUX 725. Logical one bit left shifter 717 multiplies input B by two and outputs 2B on line 774 to input "2" of MUX 725. Output line 777 of MUX 725 connects to the subtrahend input of subtractor 710. Input C connects to adder 722 and to logical one bit left shifter 718 on line 673. Logical one bit left shifter 718 multiplies input C by two and outputs 2C to adder 722 on line 775. Subtractor 710 outputs E (see FIG. 4) on line 696. Adder 722 outputs D (=3C) on line 690.

Multi-cycle multiplier 610 functions by multiplying the values on lines 635 and 640 together and outputting the result on lines 650 and 650. Steps 301-302 of PDBL algorithm 300 are performed on the microprocessor (not shown) without using multi-cycle multiplier 610 and SAU 400.

Step 303 utilizes both multi-cycle multiplier 610 and SAU 400. Register memory 695 provides $X_1$ on line 665 to input "0" of MUX 620 with MUX 620 set to "0" and $Z_1$ is provided from register memory 695 on both lines 635 and 640 to multi-cycle multiplier 610. Multi-cycle multiplier 610 computes $Z_1^2$ which is output on line 650 to input "1" of MUX 630 with MUX 630 set to "1". MUX 620 sends $X_1$ to input A of SAU 400 on line 671 and MUX 630 sends $Z_1^2$ to input B of SAU 400 on line 672. MUX 720 in SAU 400 is set to "0" and MUX 720 sends A on line 776 from line 671 to the minuend input of subtractor 710 on line 776. MUX 725 in SAU 400 is set to "1" and MUX 725 sends on line 777 B from line 672 to the subtrahend input of subtractor 710 on line 777. Subtractor 710 computes E (which is $A-B=X_1-Z_1^2$) of which is passed to register memory 695 on line 696 and stored in temporary register $T_2$.

Step 304 utilizes both multi-cycle multiplier 610 and SAU 400. Register memory 695 provides $X_1$ on line 665 to input "0" of MUX 620 and MUX 620 is set to "0". MUX 620 sends $X_1$ to input A of SAU 400 on line 671. Register memory 695 provides $T_2$ on line 660 to input "0" of MUX 630 with MUX 630 set to "0" and register memory 695 also provides $T_2$ to input C of SAU 400 on line 673. MUX 720 in SAU 400 is set to "1" and MUX 720 sends 2A from line 771 on line 776 to the minuend input of subtractor 710. MUX 725 in SAU 400 is set to "1" and MUX 725 sends B from input line 672 on line 777 to the subtrahend input of subtractor 710 on line 777. Input C ($T_2$) of SAU 400 on line 673 is sent to both logical one bit left shifter 718 and adder 720. The output 2C on line 775 from logical one bit left shifter 718 goes to adder 720. Adder 720 outputs D (which is 3C=3$T_2$) on line 690 and subtractor 710 computes E (which is 2A−B=2$X_1$−$T_2$) on line 696 to register memory 695 which passes E and D on lines 635 and 640, respectively, to multi-cycle multiplier 610 which computes E*D and sends the result on line 650 to register memory 695 where the result is stored in temporary register $T_2$.

Step 305 utilizes multi-cycle multiplier 610. $T_2$ is provided from register memory 695 to both lines 635 and 640 to multi-cycle multiplier 610 which computes and outputs $T_2^2$ on line 650 to register memory 695 where the result is stored in $X_3$.

Step 306 utilizes both multi-cycle multiplier 610 and SAU 400. Register memory 695 provides $Y_1$ on line 665 to input "0" of MUX 620 and MUX 620 is set to "0". MUX 620 sends $Y_1$ to input A of SAU 400 on line 671. Logical one bit left shifter 718 takes input A on line 671, multiplies input A by two and outputs 2A on line 771 to MUX 720. MUX 720 in SAU 400 is set to "1" and MUX 720 sends 2A on line 776 to the minuend input of subtractor 710. Binary 0 is supplied on line 660 to input "0" of MUX 630 with MUX 630 set to "0". MUX 630 sends binary 0 from line 660 to input B of SAU 400 on line 672. MUX 725 in SAU 400 is set to "1" and MUX 725 sends binary 0 on line 777 to the subtrahend input of subtractor 710. Subtractor 710 computes 2A−B on line 696 to register memory 695 as E (which is 2A−B=2$Y_1$) which passes the value through on line 635 to multi-cycle multiplier 610 and register memory 695 provides $Z_1$ on line 640 to multi-cycle multiplier 610. Multi-cycle multiplier 610 computes E*$Z_1$ (2$Y_1$*$Z_1$) and sends the result on line 650 to register memory 695 where it is stored in $Z_3$.

Step 307 utilizes both multi-cycle multiplier 610 and SAU 400. Register memory 695 provides $Y_1$ on line 665 to input "0" of MUX 620 and MUX 620 is set to "0". MUX 620 sends $Y_1$ to input A of SAU 400 on line 671. Logical one bit left shifter 715 takes input A on line 671, multiplies input A by two and outputs 2A on line 771 to input "1" of MUX 720. MUX 720 in SAU 400 is set to "1" and MUX 720 sends 2A on line 776 to the minuend input of subtractor 710. Binary 0 is supplied on line 660 to input "0" of MUX 630 with MUX 630 set to "0". MUX 630 sends binary 0 from line 660 to input B of SAU 400 on line 672. MUX 725 in SAU 400 is set to "1" and MUX 725 sends binary 0 on line 777 to the subtrahend input of subtractor 710. Subtractor 710 computes 2A−B (which is 2$Y_1$) as E on line 696 to register memory 695 which passes E through both on line 635 and on line 640 to multi-cycle multiplier 610. Multi-cycle multiplier 610 computes $E^2$ (which is $(2Y_1)^2$) and sends the result to register memory 695 on line 650 where it is stored in $Y_3$.

Step 308 utilizes both multi-cycle multiplier 610 and SAU 400. Register memory 695 provides $X_3$ on line 665 to input "0" of MUX 620 and MUX 620 is set to "0". MUX 620 sends $X_3$ to input A of SAU 400 on line 671 which connects to input "0" of MUX 720 with MUX 720 set to "0". MUX 720 sends A on line 776 to the minuend input of subtractor 710. Register memory 695 provides $Y_3$ on line 635 to multi-cycle multiplier 610 and provides $X_1$ on line 640 to multi-cycle multiplier 610. Multi-cycle multiplier 610 computes $Y_3$*$X_1$ and sends the result to input "1" of MUX 630 and MUX 630 is set to "1". MUX 630 sends $Y_3$*$X_1$ to input B of SAU 400 on line 672. Logical one bit left shifter 717 takes input B on line 672, multiplies input B by two and outputs 2B (2$Y_3$*$X_1$) on line 774 to input "2" of MUX 720. MUX 720 is set to "2" and sends 2B on line 777 to the subtrahend input of subtractor 710. Subtractor 710 computes E (which is A−2B=$X_3$−2$Y_3$*$X_1$) on line 696 to register memory 695 where it is stored in $X_3$.

Step 309 utilizes both multi-cycle multiplier 610 and SAU 400. In step 308, $Y_3$*$X_1$ was computed by multi-cycle multiplier 610. Hence, $Y_3$*$X_1$ is still present in the output register (not shown) of multi-cycle multiplier 610 and in Step 309 is sent on line 650 to input "1" of MUX 620 and MUX 620 is set to "1". MUX 620 provides $Y_3$*$X_1$ to input A of SAU 400 on line 671 which connects to input "0" of MUX 720. MUX 720 in SAU 400 is set to "0" and MUX 720 sends A (which is $Y_3$*$X_1$) on line 776 to the minuend input of subtractor 710. Register memory 695 provides $X_3$ on line 660 to input "0" of MUX 630 and MUX 630 is set to "0". MUX 630 sends $X_3$ to input B of SAU 400 on line 672 which connects to input "1" of MUX 725. MUX 725 is set to "1" and provides B on line 777 to the subtrahend input of subtractor 710. Subtractor 710 computes E (A−B=$Y_3$*$X_1$) which is sent on line 696 to register memory 695 which passes the value through on line 635 to multi-cycle multiplier 610 and register memory 695 provides $T_2$ on line 640 to multi-cycle multiplier 610. Multi-cycle multiplier 610 computes E*$T_2$ (which is ($Y_3$*$X_1$−$X_3$)*$T_2$) and sends the result on line 650 to register memory 695 where it is stored in temporary register $T_1$.

Step 310 utilizes both multi-cycle multiplier 610 and SAU 400. Register memory 695 provides $T_1$ on line 665 to input "0" of MUX 620 and MUX 620 is set to "0". MUX 620 sends $T_1$ to input A of SAU 400 on line 671 which connects to input "0" of MUX 720. MUX 720 in SAU 400 is set to "0" and MUX 720 sends A ($T_1$) on line 776 to the minuend input of subtractor 710. $Y_3$ is provided from register memory 695 to both lines 635 and 640 to multi-cycle multiplier 610 which computes $Y_3^2$ and which is output on line 650 to input "1" of MUX 630 with MUX 630 set to "1". MUX 630 provides $Y_3^2$ on line 672 to input B of SAU 400. Logical one bit right shifter 716 takes input B on line 672, divides input B by two and outputs B/2 ($Y_3^2$/2) to input "0" of MUX 725 and MUX 725 is set to "0". MUX 725 sends B/2 on line 777 to the subtrahend input of subtractor 710. Subtractor 710 computes E (A−B/2=$T_1$−$Y_3^2$/2) which is sent on line 696 to register memory 695 where it is stored in $Y_3$.

Step 311 is performed in the microprocessor and returns the result of PDBL algorithm 300 which is ($X_3$, $Y_3$, $Z_3$) for input ($X_1$, $Y_1$, $Z_1$).

The invention claimed is:
1. A data cryptographic apparatus comprising:
computational logic configured to perform an elliptic curve cryptography (ECC) point doubling operation using Jacobian coordinates over a short Weierstrass curve of the form y=$x^3$+ax+b where a=−3;
a register memory configured to store a point in the Jacobian coordinates, wherein the register memory is configured for two temporary storage variables, $T_1$ and $T_2$;
a modular multiplier electrically coupled to the register memory, wherein the modular multiplier is configured to perform at most one modular multiplication for each step in a sequence of steps in the ECC point doubling operation; and
a simple arithmetic processor configured;

to perform modular subtraction, modular multiplication by two, and modular division by two in support of the ECC point doubling operation utilizing four logical one bit left shifters, an adder, and a subtractor to output either 3C, A−B/2, A−B, A−2B, or 2A−B for an input of variables A, B, and C, wherein the simple arithmetic processor is electrically coupled to the register memory and the modular multiplier, wherein the simple arithmetic processor outputs a result of the ECC point doubling operation in the Jacobian coordinates.

2. A mobile device comprising the apparatus of claim 1.

3. A smartcard comprising the apparatus of claim 1.

4. The mobile device of claim 2, wherein the mobile device is a smartphone.

5. A method for performing an elliptic curve cryptography (ECC) point doubling operation using Jacobian coordinates over a short Weierstrass curve of the form $y=x^3+ax+b$ where $a=-3$, comprising:

accepting, as variable input at a simple arithmetic processor of a computational device, a point in the Jacobian coordinates;

configuring the simple arithmetic processor of the computational device for modular subtraction, modular division by two, and modular multiplication by two utilizing four logical one bit left shifters, an adder, and a subtractor, wherein an input of variables A, B, and C to the simple arithmetic processor results in an output of either 3C, A−B/2, A−B, A−2B, or 2A−B;

enabling, a modular multiplier of the computational device to execute a sequence of steps to perform the ECC point doubling operation of the point in the Jacobian coordinates, wherein the modular multiplier performs at most one modular multiplication for each step in the sequence of steps, wherein the sequence of steps requires no more than two temporary variables; and outputting, by the computational device, a result of the ECC point doubling operation in the Jacobian coordinates.

6. The method of claim 5, wherein the computational device is part of a mobile device.

7. The method of claim 6, wherein the mobile device is a smartphone.

8. The method of claim 5, wherein the computational device is part of a smartcard.

* * * * *